US008593011B2

(12) United States Patent
Windeler

(10) Patent No.: US 8,593,011 B2
(45) Date of Patent: Nov. 26, 2013

(54) ROTARY PUSH-BUTTON IGNITION SWITCH

(75) Inventor: Joshua G. Windeler, Grand Blanc, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 424 days.

(21) Appl. No.: 12/780,987

(22) Filed: May 17, 2010

(65) Prior Publication Data

US 2011/0278139 A1 Nov. 17, 2011

(51) Int. Cl.

| | |
|---|---|
| ***B60L 1/00*** | (2006.01) |
| ***B60L 3/00*** | (2006.01) |
| ***H02G 3/00*** | (2006.01) |

(52) U.S. Cl.
USPC .......... 307/9.1; 307/10.1; 307/10.3; 307/10.6

(58) Field of Classification Search
USPC ......................................... 307/9.1, 10.1–10.6
See application file for complete search history.

(56) References Cited

U.S. PATENT DOCUMENTS

| | | | | |
|---|---|---|---|---|
| 6,573,615 | B1 | 6/2003 | Asakura et al. | |
| 7,290,416 | B2 | 11/2007 | Ohtaki et al. | |
| 2004/0155525 | A1* | 8/2004 | Ohtaki et al. | 307/10.5 |
| 2008/0032753 | A1* | 2/2008 | Nho | 455/569.1 |
| 2008/0061797 | A1* | 3/2008 | Xiao et al. | 324/556 |
| 2009/0134003 | A1* | 5/2009 | Okidate | 200/536 |

* cited by examiner

*Primary Examiner* — Rexford Barnie
*Assistant Examiner* — Toan Vu
(74) *Attorney, Agent, or Firm* — Ralph E. Smith

(57) ABSTRACT

A vehicle system includes a switch that is movable between first and second positions in a linear direction and moveable between third and fourth positions in a rotational direction. The system also comprises a control module that responds to the switch when the switch is in both the second position and the fourth position. The control module does not respond to the switch being moved from the third position to the fourth position unless the switch is also moved from the first position to the second position.

20 Claims, 4 Drawing Sheets

ROTARY PUSH-BUTTON IGNITION SWITCH

FIELD

The present invention relates to vehicle ignition and more particularly to vehicle ignition switches.

BACKGROUND

A keyless ignition system for a motor vehicle, such as a keyless-go ignition system, utilizes a start/stop button instead of the commonly used ignition key lock mechanism. An engine control module within the vehicle receives an identification signal from a remote signaling device such as a key fob or a passive signaling device. The engine control module recognizes the identification signal and allows operation of the start/stop button in response to detecting an authorized identification signal. An operator then pushes the start/stop button to activate the vehicle engine. The operator also presses the button to deactivate the vehicle engine.

SUMMARY

A vehicle system comprises a switch that is movable between first and second positions in a linear direction and moveable between third and fourth positions in a rotational direction. The system also comprises a control module that responds to the switch when the switch is in both the second position and the fourth position. The control module does not respond to the switch being moved from the third position to the fourth position unless the switch is also moved from the first position to the second position.

The switch comprises a button that comprises a push-button portion that depresses from the first to the second position and a rotary portion that rotates from the third position to the fourth position prior to depression of the push-button. The push-button portion does not rotate when the rotary portion rotates. The rotary portion rotates from the fourth position to the third position to deactivate operation of a vehicle subsystem. The push-button portion is not pushed to deactivate operation of the vehicle subsystem. The control module comprises an ignition control module that starts an engine of the vehicle in response to the switch.

The vehicle system further comprises an engine control module and an indicator that indicates authorization to use the switch. The ignition control module does not respond to the switch unless the authorization is received by one of the ignition control module and the engine control module. The switch is moveable between third and fifth positions in the rotational direction. The fifth position is between the third and fourth positions. The fifth position corresponds to control operations of vehicle accessories. The fourth position corresponds to engine activation.

The vehicle system further comprises a first resistance, a second resistance and a third resistance. The first resistance is connected in parallel with the second resistance and not the third resistance when the switch moves from the first position to the second position and from the third position to the fifth position. The first resistance is connected in parallel with the second and third resistances when the switch moves from the first position to the second position and from the third position to the fourth position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

As used herein, the term module refers to components, devices and systems that are electric and/or mechanical that provide signals, instructions, and/or activate other vehicle components and systems. Modules can include all those functions listed above. Further, a module may be an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
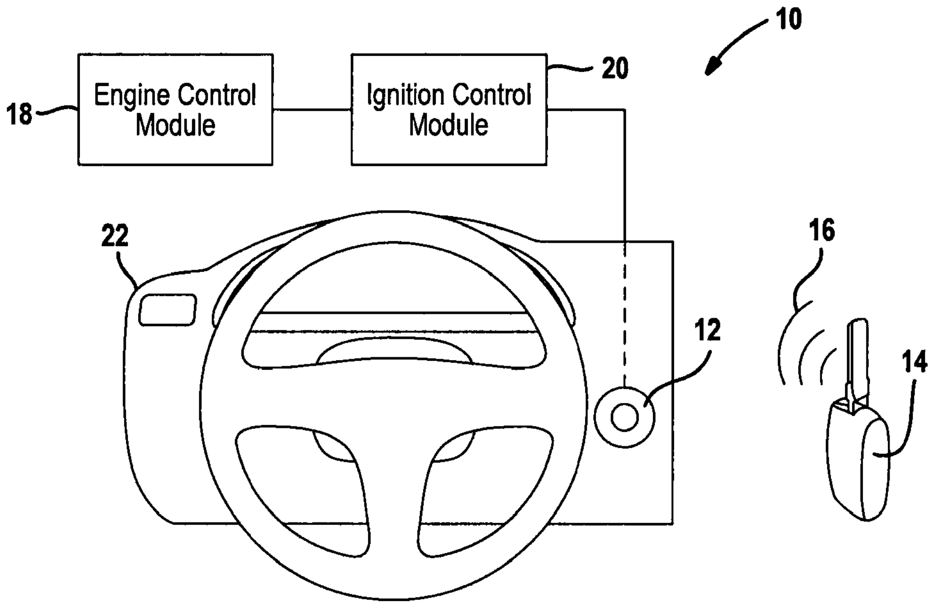
FIG. 1 is a vehicle system, according to the present disclosure.

Referring now to FIG. 1, a vehicle ignition switch system 10 is illustrated. The vehicle system 10 includes a start/stop switch 12 and an identification device 14. The switch 12 may include a button, a knob, and or other similar switching device. The identification device 14 may be a key fob or a passive signaling device.

The identification device 14 may emit an identification signal 16 that is received by an engine control module 18. The engine control module 18 verifies the identification signal 16 and enables an ignition control module 20. The start/stop switch 12 is configured to enable operation of one or more subsystems of the vehicle system 10 and then stop operation of the one or more subsystems of the vehicle system 10. The vehicle subsystems include one or more of the following: ignition control, engine control, climate control, windshield wiper control, infotainment, navigation systems control, and dashboard display control. Dashboard display control includes providing odometer indications, fuel indications, and the like. Various other vehicle subsystems are also contemplated within the scope of the present disclosure. The switch 12 may be located on the dashboard 22 of the vehicle system 10. However, this is simply one embodiment of the application and various other locations for the switch 12 may also be used.

Figure 2:
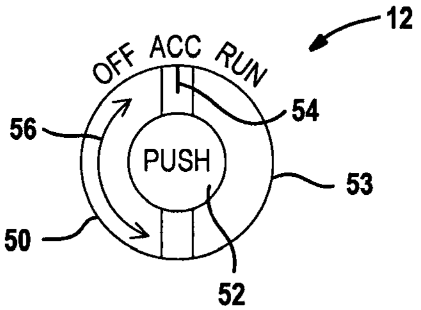
FIG. 2 is a front view of a switch, according to the present disclosure.
Figure 3:
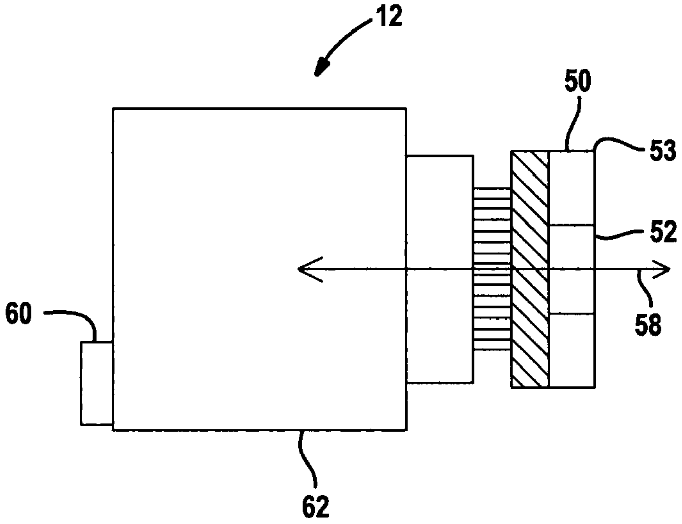
FIG. 3 is a side view of the switch, according to the present disclosure.

Referring now to FIGS. 2 and 3, the switch 12 is further illustrated. In one embodiment of the application, the face 50 of the switch includes instructions and/or other indications of operation of the switch 12. For example, the switch 12 includes a term such as "push" located in a center push portion 52 of the switch 12. This indicates to a vehicle operator that a region of the switch 12 is to move along a linear direction. Further indications are provided to indicate rotational operations of the switch 12. For example, the terms "OFF", "accessory" (shown in FIG. 2 as "ACC"), and "RUN" may be located in the vicinity of the face 50 of the switch 12 to indicate that a portion of the switch (e.g. an outer rim rotary portion 53) of the face 50 is to be rotated.

In one embodiment, the switch 12 also includes an indicator 54 that illustrates the position of the rotary portion 53 relative to the terms "OFF", "accessory" ("ACC") and "RUN". When the switch is at one of the following positions: "OFF" indicates that one or more components or systems of the vehicle is non-operational, "ACC" indicates that one or more accessories of the vehicle such as the radio or various other vehicle subsystems are enabled, and "RUN" indicates that the vehicle ignition is enabled. Directional line 56, shown in FIG. 2, illustrates rotational movement of the switch 12. Directional line 56 may be imprinted on the switch 12. Directional line 58, shown in FIG. 3, illustrates linear movement of the switch 12.

The switch 12 connects via a connector 60 to vehicle systems, such as the ignition control module 20 and the engine control module 18. The switch 12 includes a housing 62 that may hold mechanical and/or electrical components of the switch 12. For example, the switch 12 may include a spring within the housing 62 (not shown) so that, at one switch position, when a push portion 52 of the face 50 of the switch 12 is depressed, the push portion 52 will return to its former position. The housing 62 may also enclose gears and or other such mechanisms (not shown) such that the rotary or other functions of the switch 12 may be implemented.

Figure 4A:
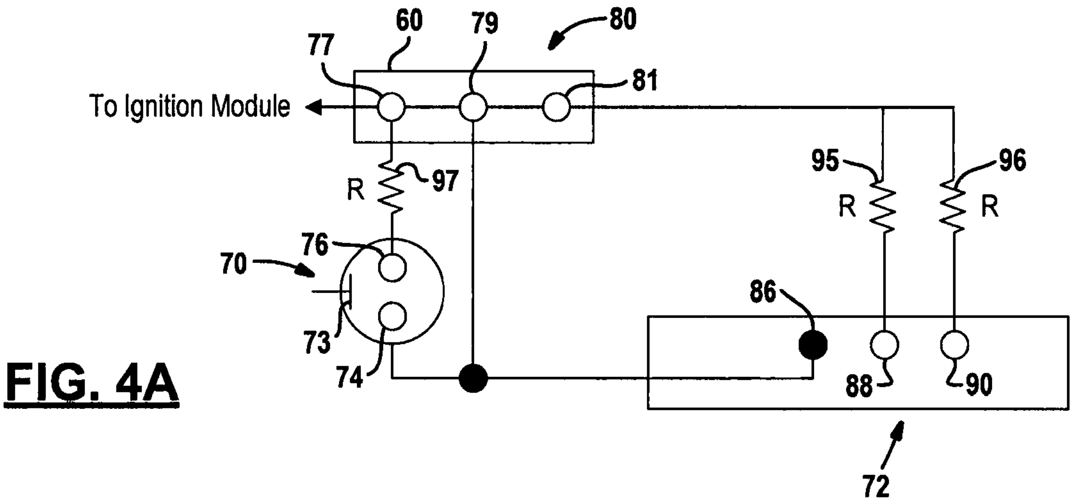
FIGS. 4A-4C and 5 are schematic diagrams of the switch, according to the present disclosure.
Figure 4B:
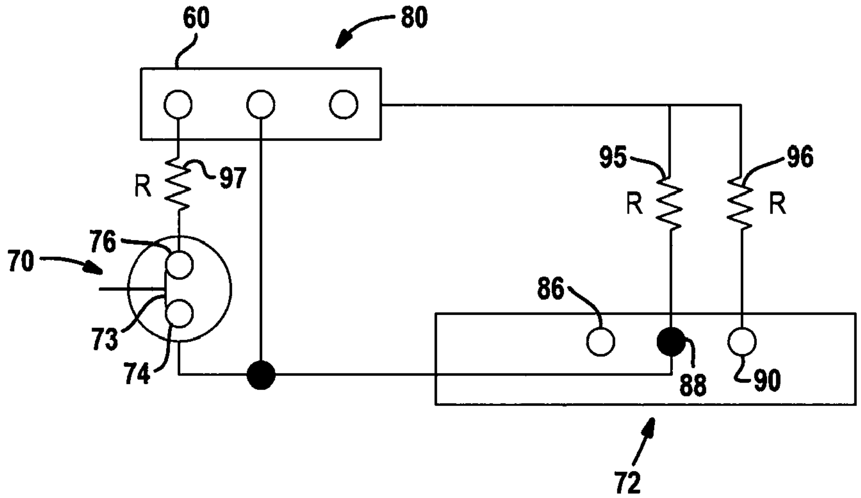
Figure 4C:
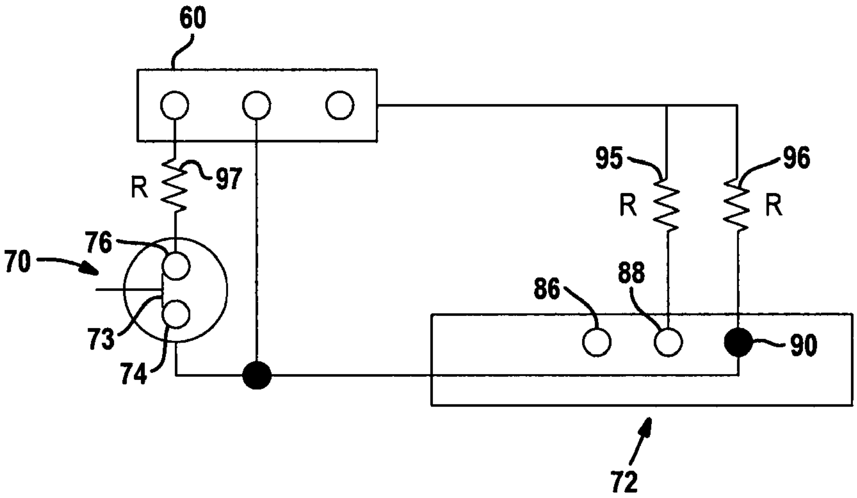

Referring now to FIGS. 4A through 4C, the switch 12 is illustrated in further detail. The switch 12 includes both a rotary portion and a push-button portion. In one exemplary embodiment, the rotary portion 53 moves independently of the push portion 52. In other words, rotating the rotary portion 53 does not rotate the push portion 52, and depression of the push portion 52 does not depress the rotary portion 53. In an alternative exemplary embodiment, movement of the rotary portion 53 enables depression of the push portion 52. In this embodiment, the push portion 52 cannot be depressed unless the rotary portion 53 has been rotated. In another alternative exemplary embodiment, rotation of the rotary portion 53 rotates but does not depress (and thus does not implement operation of) the push portion 52. In another alternative exemplary embodiment, the push portion may be depressed before or simultaneously with rotation of the rotary portion 53. In an alternative exemplary embodiment, depression of the push portion 52 depresses the rotary portion 53 but does not rotate (and thus does not implement operation of) the push portion 52.

In one operational embodiment, an operator rotates the rotary portion 53 first and then pushes the push portion 52 to activate subsystems of the system 10. Examples of subsystems include: ignition control, engine control, climate control, windshield wiper control, radio control, navigation systems control, and dashboard display control. FIG. 4A illustrates an example of the electrical components 70 of the push portion 52 of the switch 12 and also illustrates an example of the electrical components 72 of the rotary portion 53 of the switch 12. In FIG. 4A the push portion 52 has not been pushed. In FIGS. 4B and 4C, the push portion 52 has been pushed to engage corresponding contacts. When pushed, a connector 73 engages two contacts 74, 76 within the switch 12.

In one embodiment, when the contacts 74, 76 are connected, the ignition control module 20 reads the resistance of the circuits to determine if conditions are correct to activate the ignition. The ignition control module 20 reads the resistance via connections 77, 79, 81. If the rotary portion 53 has been positioned in the "RUN" position, and the push portion 52 is pushed, the vehicle ignition can be activated. If the push-button 52 is pushed and the rotary portion 53 is in any other position, such as "OFF", the ignition control module 20 will not activate the ignition.

After the rotary portion 53 is rotated, the push portion 52 is operated. This sequence of push and rotary functions causes the switch 12 to send a signal that activates one or more vehicle subsystems, such as ignition control, as stated above. In one embodiment, to turn only the engine off but leave the vehicle accessories active, the rotary portion 53 is rotated so the indicator 54 points to the accessory (ACC) position. In an alternative embodiment, to turn the vehicle engine off, the rotary portion 53 is rotated back to the OFF position, which also turns of the one or more vehicle subsystems. The push portion 52 is not pushed again to turn the vehicle off. In an alternative embodiment, the rotary portion 53 is rotated back to the OFF position, and the push portion 52 is pushed again to turn the vehicle off. In an alternative embodiment, if the ignition has already been activated and the vehicle is running, pressing the push portion 52 again shuts the engine off, but the rotary portion 53 of the switch 12 remains in a run state; and the indicator 54 points to the RUN position. To restart the engine, for this embodiment, only the push portion 52 need then be pushed.

In FIG. 4A the switch 12 has not been rotated and is in the OFF position, which corresponds to contact 86. In FIG. 4B the switch 12 has been rotated to the accessory position, which corresponds to contact 88. In FIG. 4C the switch 12 has been rotated to the RUN position, which corresponds to contact 90. Each of the contacts 88, 90 include respective resistances 95, 96 that may be different so that different signals can be sent to the ignition control module 20. In one embodiment, the push portion 52 and the rotary portion 53 connect a first resistance 97 of the push portion 52 in parallel with respective second and third resistances 95, 96 of the rotary portion 53. In one embodiment, resistance values for 95, 96, and 97 are different values. Essentially, changes in resistance indicate to the ignition control module 20 changes in position of the rotary portion 53 and/or the push portion 52.

Figure 5:
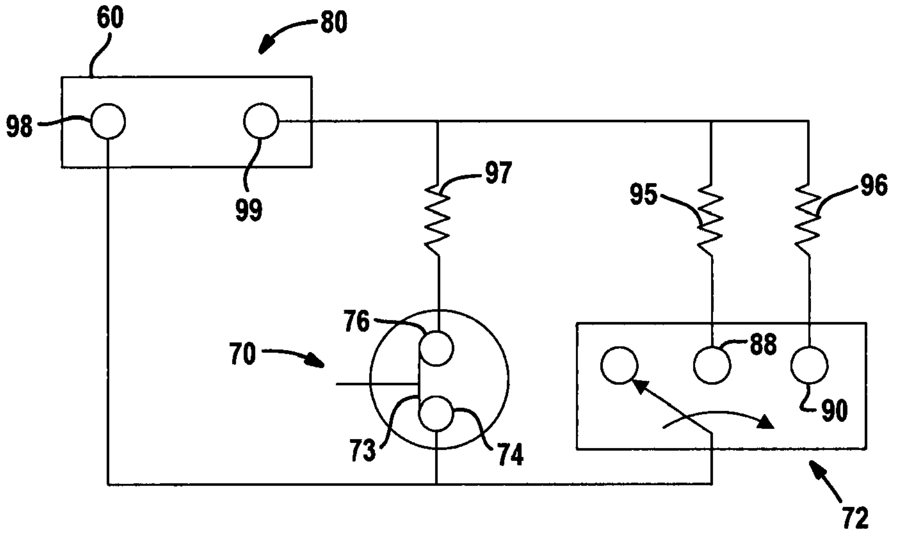

Referring now to FIG. 5, an alternative embodiment of the switch 12 is illustrated. In FIG. 5, a connector 60 includes two connections 98, 99 instead of the three connections 77, 79, 81 shown in FIGS. 4A-4C. Further, the push portion 52 of the switch 12 is arranged connected to the same connection 99 as the rotary portion 53, unlike in FIGS. 4A-4C.

Figure 6:
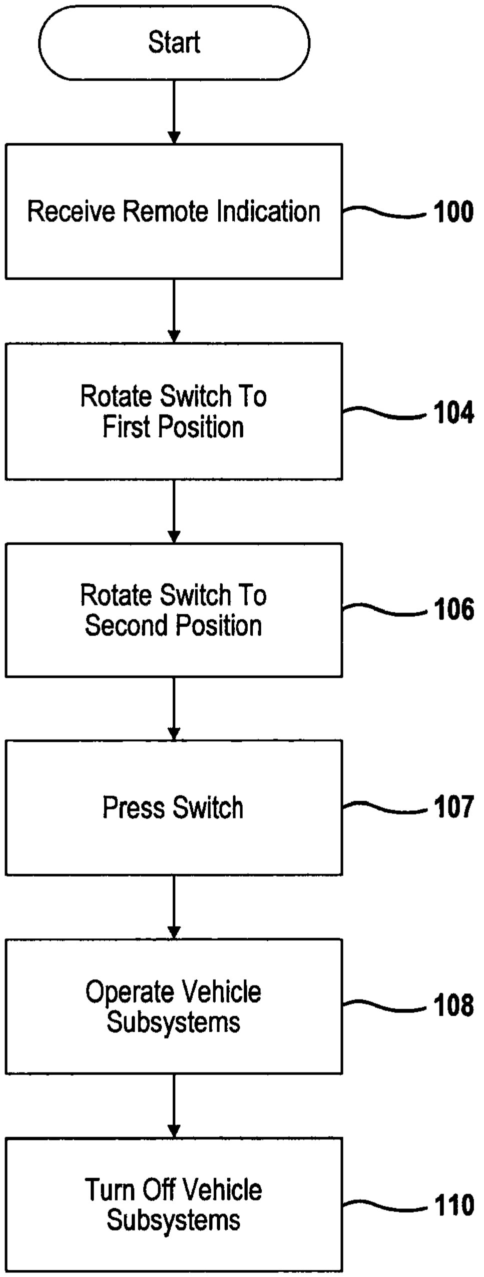
FIG. 6 is a logic flow diagram that illustrates a method for operating the switch, according to the present disclosure.

Referring now to FIG. 6, a logic flow diagram illustrates a method for operating the switch 12. In step 100 the engine control module 18 receives an indication that the identification device 14 is present. In step 104 the operator rotates rotary portion 53 of the switch to a first position from an OFF position, thereby enabling one or more of the vehicle accessories. In step 106 the operator rotates the switch 12 to a second position or RUN position, thereby enabling vehicle engine ignition. In step 107 an operator depresses the push portion 52 of the switch 12, thereby directing a signal to activate vehicle engine operation. In step 108 the vehicle is operational. When the vehicle is operational, various vehicle subsystems are activated. For example, vehicle subsystems include one or more of the following: ignition control, engine control, climate control, windshield wiper control, radio control, navigation systems control, and dashboard display control. In step 110, the operator rotates the rotary portion 53 back to the OFF position, thereby sending a signal to disable the various vehicle subsystems, such as the engine control subsystem, and thereby turn the subsystems off. Alternatively, the operator presses the push portion 52 without rotating the rotary portion, thereby turning the vehicle off.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle system comprising:

a switch that is movable between first and second positions in a linear direction and moveable between third and fourth positions in a rotational direction; and a control module that responds to the switch to activate operation of a vehicle subsystem when the switch is in both the second position and the fourth position, wherein the control module does not respond to the switch being moved from the third position to the fourth position to activate the operation of the vehicle subsystem unless the switch is also moved from the first position to the second position after the switch has been moved from the third position to the fourth position.

2. The vehicle system of claim 1, wherein the switch comprises a button that includes a push-button portion that depresses from the first to the second position and a rotary portion that rotates from the third position to the fourth position prior to depression of the push-button.

3. The vehicle system of claim 2, wherein the rotary portion surrounds the push-button portion and the push-button portion does not rotate when the rotary portion rotates.

4. The vehicle system of claim 2, wherein the rotary portion rotates from the fourth position to the third position to deactivate operation of a vehicle subsystem, wherein the push-button portion is not pushed to deactivate operation of the vehicle subsystem.

5. The vehicle system of claim 1, wherein the control module comprises an ignition control module that activates a vehicle engine in response to the switch.

6. The vehicle system of claim 5, further comprising:

an identification device that indicates authorization to use the switch; and an engine control module, wherein the ignition control module does not respond to the switch unless the authorization is received by one of the ignition control module and the engine control module.

7. The vehicle system of claim 1, wherein the switch is moveable between third and fifth positions in the rotational direction, wherein the fifth position is between the third and fourth positions, wherein the fifth position corresponds to control operations of vehicle accessories, and wherein the fourth position corresponds to engine activation.

8. The vehicle system of claim 7, further comprising a first resistance, a second resistance and a third resistance, wherein the first resistance is connected in parallel with the second resistance and not the third resistance when the switch moves from the first position to the second position and from the third position to the fifth position.

9. The vehicle system of claim 8, wherein the first resistance is connected in parallel with the second and third resistances when the switch moves from the first position to the second position and from the third position to the fourth position.

10. A method for operating a vehicle system comprising:

moving a switch between first and second positions in a linear direction;

moving the switch between third and fourth positions in a rotational direction;

generating a signal to activate operation of a vehicle subsystem when the switch is in the second position and the fourth position; and wherein the signal is not generated unless the switch is also moved from the first position to the second position after the switch has been moved from the third position and the fourth position.

11. The method of claim 10, wherein the switch comprises a button that includes a push-button portion that depresses from the first to the second position and a rotary portion that rotates from the third position to the fourth position prior to depression of the push-button.

12. The method of claim 11, wherein the rotary portion surrounds the push-button portion and the push button portion does not rotate when the rotary portion rotates.

13. The method of claim 12, wherein the rotary portion does not move when the push-button portion is pushed.

14. The method of claim 12, further comprising rotating the rotary portion from the fourth position to the third position to deactivate a vehicle subsystem, wherein the push-button portion is not pushed to deactivate the vehicle subsystem.

15. The method of claim 10, further comprising activating a vehicle engine in response to the signal.

16. The method of claim 10, further comprising indicating authorization to use the switch.

17. The method of claim 16, wherein the switch is not operational unless the authorization is received by one of an ignition control module and an engine control module.

18. The method of claim 10, further comprising moving the switch between third and fifth positions in the rotational direction, wherein the fifth position is between the third and fourth positions, wherein the fifth position corresponds to control operations of vehicle accessories, and wherein the fourth position corresponds to activation of an engine.

19. The method of claim 18, further comprising connecting a first resistance in parallel with a second resistance and not a third resistance when the switch moves from the first position to the second position and from the third position to the fifth position.

20. The method of claim 19, further comprising connecting the first resistance in parallel with the second and third resistances when the switch moves from the first position to the second position and from the third position to the fourth position.

* * * * *